(No Model.)

T. F. HANDLY.
ICE CREAM DISHER AND MOLD.

No. 586,181.  Patented July 13, 1897.

Witnesses:
A. R. Appleman Jr.
A. W. Milsap

Inventor:
Thomas F. Handly
By Henry C. Evert, Att'y.

UNITED STATES PATENT OFFICE.

THOMAS F. HANDLY, OF ALLEGHENY, PENNSYLVANIA.

ICE-CREAM DISHER AND MOLD.

SPECIFICATION forming part of Letters Patent No. 586,181, dated July 13, 1897.

Application filed September 5, 1896. Serial No. 604,989. (No model.)

*To all whom it may concern:*

Be it known that I, THOMAS F. HANDLY, a citizen of the United States of America, residing at Allegheny, in the county of Allegheny and State of Pennsylvania, have invented certain new and useful Improvements in Ice-Cream Dishers and Molds, of which the following is a specification, reference being had therein to the accompanying drawings.

This invention relates to certain new and useful improvements in ice-cream dishers and molds, and has for its object to construct a disher and mold that can be operated conveniently and easily with one hand.

The invention further aims to provide a disher and mold of the above-referred-to class that will be extremely simple in its construction, strong, durable, effectual in its operation, and comparatively inexpensive to manufacture; furthermore, a disher and mold that will expedite the labor in using same by reason of the rapid manner in which it may be manipulated.

This invention consists in applying a spring to the cutters, the spring performing a double function—namely, that of a spring and an operating-lever.

The invention further aims to apply the power directly to the cutters without the aid of any delicate or complicated mechanism, that may be readily operated with one hand.

The invention further consists in the novel construction, combination, and arrangement of parts to be hereinafter more particularly described, and specifically pointed out in the claim.

In describing the invention in detail reference is had to the accompanying drawings, forming a part of this specification and wherein like letters of reference indicate similar parts throughout the several views, in which—

Figure 1:
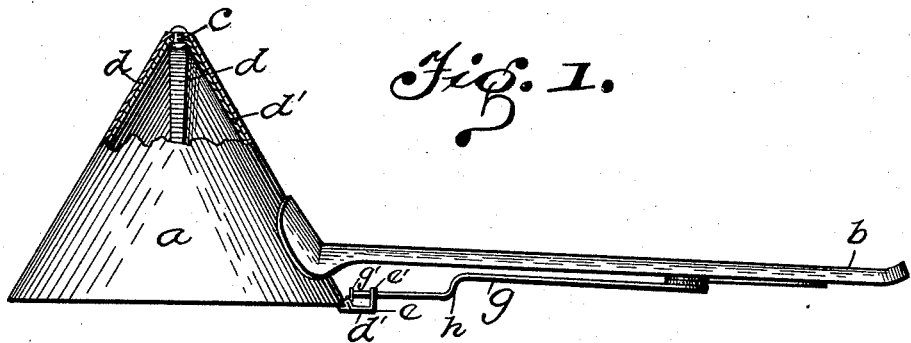
Figure 2:
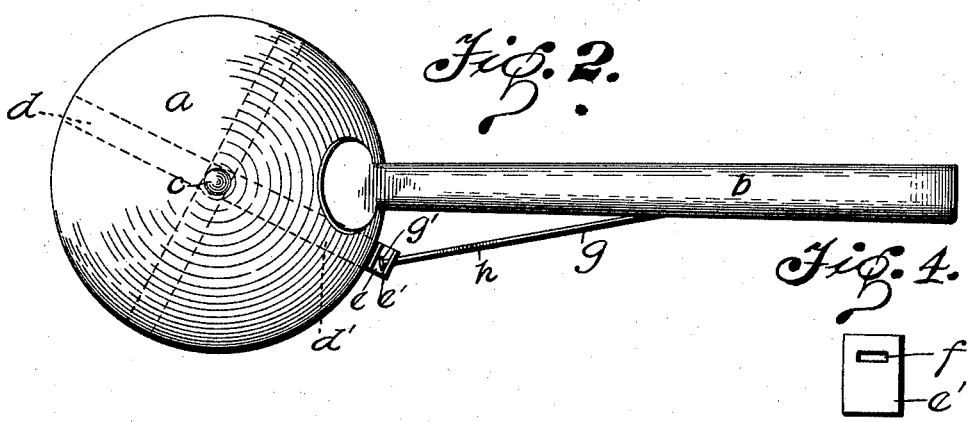
Figure 4:
Figure 3:
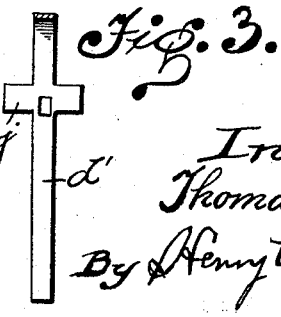

Figure 1 is a side elevation, partly in section, of my improved mold and disher. Fig. 2 is a top plan view of the same. Fig. 3 is a plan view of the cutter, to which is attached the operating-spring. Fig. 4 is a view of the end of the extended cutter.

In the drawings, $a$ indicates the mold, to which is secured the handle $b$. In the apex of the cone-shaped mold is secured a pin $c$. Said pin carries cutters $d$. One of said cutters $d'$ is extended and bent outwardly in alinement with the lower line of the mold, as shown at $e$. The said part is bent up at right angles, as shown at $e'$. The said portion $e'$ is provided with a slot $f$ for the reception of the spring $g$, forming the operating-lever, said spring carrying on its free end a head $g'$, the other end of the spring being rigidly secured to the under side of the handle.

The spring $g$ is preferably bent, as shown at $h$, in order to secure a more convenient grasp to operate the spring by a slight pressure of the thumb.

The operation of my improved mold and disher is as follows: In order to disengage the cream or other substance from the mold, a lateral pressure on the spring is applied, which will communicate motion to the cutters and revolve the latter a sufficient distance to cut the cream from the interior walls of the cone-shaped mold.

It will be noted that the relative position of the spring to the handle is such that it affords a convenient and easy operation. In Fig. 1 of the drawings the spring is shown as it appears at the completion of the operation, when the cream is removed from the mold, and in Fig. 2, the spring is shown as returned to its normal position.

The device may be easily cleaned at any time.

I wish to call particular attention to the fact that by the use of my preferred form of disher, as disclosed in Figs. 1 and 2 of the drawings, the operative mechanism is placed in such a position that it will not come in contact with or gather the cream.

It will be noted that various changes may be made in the details of construction without departing from the general spirit of my invention.

Having fully described my invention, what I claim as new, and desire to secure by Letters Patent, is—

In combination, a mold, cutters operating in the mold, one of said cutters extending in alinement with the lower portion of said mold, thence extending upward at right angles, said projecting portion being slotted, a spring secured to the handle of the mold with its end operating in the slot of the cutter and a head on the spring for holding it in the slot, substantially as described.

In testimony whereof I affix my signature in presence of two witnesses.

THOMAS F. HANDLY.

Witnesses:
H. C. EVERT,
ARNOLD MUELLER.